United States Patent [19]

Hisatsugu et al.

[11] 4,371,454
[45] Feb. 1, 1983

[54] PROCESS FOR PREPARING SPHERICAL CARBON MATERIAL AND SPHERICAL ACTIVATED CARBON

[75] Inventors: Kaji Hisatsugu; Kazuhiro Watanabe, both of Iwaki, Japan

[73] Assignee: Kureha Kagaku Kogyo Kabushiki Kaisha, Tokyo, Japan

[21] Appl. No.: 201,927

[22] Filed: Oct. 29, 1980

[30] Foreign Application Priority Data

| Nov. 2, 1979 | [JP] | Japan | 54-142154 |
| Nov. 2, 1979 | [JP] | Japan | 54-142155 |
| Apr. 15, 1980 | [JP] | Japan | 55-49925 |

[51] Int. Cl.³ .............................................. C01B 31/02
[52] U.S. Cl. ........................................ 252/422; 252/421; 264/15; 264/29.1; 264/29.3; 264/29.5; 264/29.6; 264/143; 264/344; 423/445; 423/449
[58] Field of Search ............... 264/29.6, 29.1, 29.3, 264/29.5, 15, 143, 344; 423/449, 445; 428/402; 252/421, 422

[56] References Cited

U.S. PATENT DOCUMENTS

| Re. 29,101 | 1/1977 | Amagi et al. | 252/421 |
| 3,533,961 | 10/1970 | Voet et al. | 264/29.3 |
| 3,869,302 | 3/1975 | Shea et al. | 264/15 |
| 3,953,345 | 4/1976 | Saito et al. | 252/421 |
| 3,960,761 | 6/1976 | Burger et al. | 252/421 |
| 4,002,587 | 1/1977 | Watanabe et al. | 264/29.5 |
| 4,045,368 | 8/1977 | Katori et al. | 252/421 |
| 4,124,529 | 11/1978 | Jüntgen et al. | 264/29.1 |
| 4,228,037 | 10/1980 | Hino et al. | 264/29.5 |
| 4,273,675 | 6/1981 | Shiiki et al. | 264/29.1 |

FOREIGN PATENT DOCUMENTS

| 329652 | 5/1930 | United Kingdom . |
| 983514 | 2/1965 | United Kingdom | 264/29.1 |

*Primary Examiner*—Jeffery R. Thurlow
*Attorney, Agent, or Firm*—Wegner & Bretschneider

[57] ABSTRACT

Spherical carbon material or a spherical activated carbon is prepared from an admixture of pitch, amorphous carbon and a viscosity-controlling agent by the process comprising the step of heating and extruding the admixture into strings, cooling and cutting the string into fragments, introducing the fragments into hot water to obtain spherical particles of the admixture, removing the viscosity-controlling agent from the spherical particles, infusibilizing the spherical particles and carbonizing the spherical particles and further activating the carbonized spherical carbon particles.

3 Claims, No Drawings

PROCESS FOR PREPARING SPHERICAL CARBON MATERIAL AND SPHERICAL ACTIVATED CARBON

BACKGROUND AND DETAILED DESCRIPTION OF THE INVENTION

The present invention relates to a spherical carbon material, a spherical activated carbon and processes for preparing the two, respectively.

Hitherto, for preparing spherical carbon materials or spherical activated carbon, a method of molding a mixture of powdery carbon and a binding agent or a method in which a viscosity-controlling agent is mixed into petroleum pitch or coal-tar pitch and, after melt-molding the mixture in spherical shape, the viscosity-controlling agent is removed from the shaped material by extraction with a solvent, and in which the spherical pitch is then infusibilized, baked and/or activated has been practicized (Japanese Patent Publication No. 18879/75). Particularly, according to the last-mentioned method, a spherical carbon material small in apparent density, hardly pulverizable into minute powder and applicable as a carbon material for various fields is obtained. More specifically, the spherical activated carbon obtained by the last-mentioned method is effectively applicable for treating waste water and exhaust gases.

However, the last-mentioned method cannot supply a spherical carbon material or spherical activated carbon excellent in crushing strength and abrasion strength.

In addition, the productive efficiency of the last-mentioned method is reduced to a large extent due to the long time period for infusibilization in the case of using a pitch of low softening point, and it is extremely difficult to prepare a spherical carbon material or spherical activated carbon of high mechanical strength from low-quality pitch according to the last-mentioned method. Furthermore, since the melted mixture of the starting material, that is, pitch and the viscosity-controlling agent, is formed into spherical particles by shearing force in the aqueous medium, the distribution of their size represented by the diameter of the particle is broad. Accordingly, in the case where the spherical product with a uniform size is needed, it is necessary to provide an additional step of sifting.

For instance, in the case of treating waste water in a fixed-bed system or fluidized bed composed of such spherical activated carbon, crushing of the spherical activated carbon frequently occurs at the low part of the above-mentioned fluidized bed resulting in the clogging of the bed or the passage due to the thus powdered activated carbon, in the case where the crushing strength and abrasion strength of the spherical activated carbon are not sufficient. On the other hand, with a spherical activated carbon high in crushing strength and abrasion strength, an extremely effective treatment of waste water, etc. is possible. In addition, the field of application of spherical carbon material or spherical activated carbon having high mechanical strength is very wide, and such shaped carbon material and activated carbon have been strongly desired.

It is an object of the present invention to provide spherical carbon material (or a spherical activated carbon) prepared by the process comprising the steps of:

heating while continuously stirring an admixture of (a) 100 parts by weight of a mixture of 30 to 95% by weight of a pitch and 5 to 70% by weight of amorphous carbon particles of a diameter of less than 200 microns and (b) 5 to 50 parts by weight of a viscosity-controlling agent, thereby fluidifying uniformly said admixture;

extruding the thus fluidified admixture from an extruding die, thereby forming the fluidified admixture into a string-like shape;

cooling and cutting the thus formed string-likely shaped admixture into fragments of stick-like shape;

putting the thus obtained stick-likely shaped fragments into hot water kept at a temperature higher than the softening point of said admixture thereby obtaining spheres from said admixture; and subjecting the thus obtained spheres to a series of treatments for removal of said viscosity-controlling agent, infusibilization by the use of a gaseous oxidant or of an aqueous solution of an oxidant and carbonization (and/or activation).

Another object of the present invention is to provide a process for preparing a spherical carbon material (or a spherical activated carbon), comprising the above-mentioned steps.

As a petroleum pitch for use in the present invention, for instance, pitches obtained by thermal cracking of petroleum products such as crude oil, heavy oil, naphtha, asphalt, light oil and kerosene, or pitches obtained by thermal polymerization of the above-mentioned petroleum products are mentioned. As a coal-tar pitch for use in the present invention, polymerized products of high pitch and medium pitch are mentioned, preferably those having a softening point of higher than 140° C.

Amorphous carbon particles for use in the present invention are substantially composed of amorphous carbon such as charcoal obtained by dry distillation of ligneous material such as wood, coconut-shell and sawdust, those carbons obtained by dry distillation of coal such as green-cokes and carbon black, having less than 200 microns in mean diameter. The weight ratio of the pitch to the amorphous carbon particles is 30:70 to 95:5, and the content of amorphous carbon particles in the above-mentioned admixture is preferably 5 to 50% by weight. In a case of the content of amorphous carbon particles of less than 5% by weight of the admixture, the effect of adding the amorphous carbon particles is not observed, and on the other hand, in a case of the content of amorphous carbon particles of more than 70% by weight, the viscosity of the admixture becomes large enough to cause the difficulty of spherilization. The size of the amorphous carbon particles is less than 200 microns in average diameter, preferably less than 150 microns. If it is larger than 200 microns, it is difficult to shape the spherical product because of the unevenness of the surface of the product due to the amorphous particles.

The viscosity-controlling agent for use in the present invention is selected from the group consisting of bi- and tricyclic aromatic hydrocarbon of a favorable compatibility with the pitch and of a boiling point higher than 200° C., for instance, naphthalene, methylnaphthalene, phenylnaphthalene, benzylnaphthalene, methylanthracene, phenanthrene and biphenyl, or from the group consisting of mixtures of more than one of the above-mentioned compounds. Among the above-mentioned compounds, naphthalene is particularly preferable from the view point of its large ability of controlling the viscosity of the above-mentioned pitch and its easy extractability in the step of extraction by a solvent. The relative amount of the viscosity-controlling agent is 5 to 50 parts by weight to 100 parts by weight of the mixture of pitch and amorphous carbon particles, and in practice, the amount is selected from the above-mentioned range according to the weight ratio of the pitch to the amorphous carbon particles. Since the viscosity of the above-mentioned mixture becomes larger with the increase of the amount of the amorphous carbon particles in the mixture, it is preferable to increase the amount of the viscosity-controlling agent, and on the other hand, in the case where the added amount of the amorphous carbon particles is relatively smaller, it is preferable to use the viscosity-controlling agent in a relatively smaller amount. However, in the case where the amount of the agent is less than 5 parts by weight to 100 parts by weight of the mixture of the pitch and the amorphous carbon particles, the viscosity of the above-mentioned admixture is so large that the shaping is difficult and moreover, the shaped material prepared from the admixture becomes non-porous to make the infusibilization difficult. On the other hand, in the case where the amount of the viscosity-controlling agent is larger than 50 parts by weight to 100 parts by weight of the mixture of the pitch and the amorphous carbon particles, the shaped material obtained after solvent-extraction becomes too porous with macro-pores and, accordingly, friable and poor in strength.

The above-mentioned admixture consisting of pitch, amorphous carbon particles and a viscosity-controlling agent is shaped as follows:

The admixture is heated to a temperature higher than its softening point to be processed and extruded from a die in a state of string-like material, and after cooling, the thus solidified string-likely shaped admixture is crushed into pellets or small sticks and then shaped into spherical particles by putting the sticks into hot water at a temperature higher than the softening point of the admixture. By applying the above-mentioned process of spherilization, it is possible to obtain spherical particles of the admixture even if the viscosity of the admixture is considerably high, and the dispersion of the diameter of the thus obtained spherical particles is substantially narrow in range.

As an organic solvent for use in extracting the viscosity-controlling agent from the thus obtained spherical particles, those substantially not dissolving the pitch and the amorphous carbon particles but well dissolving the viscosity-controlling agent, for instance, aliphatic hydrocarbons such as hexane, heptane, naphtha and kerosene, saturated alicyclic hydrocarbons such as cyclohexane, and aliphatic alcohols such as methanol, ethanol and propanol serve as examples. In addition, extraction of the viscosity-controlling agent by an organic solvent is carried out in one step or in multiple stages. The thus obtained spherical particles, deprived of the viscosity-controlling agent, are porous.

In the next step of infusibilization of the thus obtained porous particles, an oxidant is used. The oxidants for use in this step are roughly classified into (a) gaseous oxidant, for instance, molecular oxygen, ozone, nitrogen dioxide, sulfur trioxide, air, and mixtures thereof; and (b) aqueous solutions of oxidants, for instance, an aqueous solution of acid such as, nitric acid, sulfuric acid, persulfuric acid, peracetic acid or a mixture of said acids; and an aqueous solution of salts such as permanganates, chromates, salts of halogen oxyacid or mixture thereof.

In cases of infusibilization while using a gaseous oxidant, the above-mentioned porous particles are heated in an atmosphere including the gaseous oxidant gradually at a rate of 15° to 30° C./hour to about 400° C.

In case of infusibilization while using an aqueous solution of an oxidant, since the amorphous carbon particles in the above-mentioned porous particles contribute to infusibilization of the pitch material in the porous particles, the process of infusibilization is extremely easily carried out by using 0.2 to 100 parts by weight, preferably 0.2 to 30 parts by weight of an aqueous solution of the oxidant at a concentration of 5 to 90% by weight, preferably 5 to 70% by weight to one part of the above-mentioned porous particles at a preferable temperature of 20° to 90° C. In the actual process of infusibilization, the porous particles are immersed in the aqueous solution of the oxidant, or after spraying with the solution, the porous particles are kept a while at room temperature or at a temperature of 20° to 90° C. In cases of using a too diluted solution of the oxidant, a large amount of the aqueous solution is necessary, and on the other hand, in cases of using a too concentrated solution of the oxidant, it is difficult to control the reaction temperature of infusibilization because of the vigorous oxidation of the pitch by the oxidant. In cases of using an amount of the oxidant solution less than 0.2 parts by weight to one part by weight of porous particles, it is difficult to obtain the uniformly infusibilized material, and on the other hand, even in case of using more than 100 parts by weight of the oxidant solution to one part by weight of the porous particles, the term of infusibilization does not shorten in proportion to the amount of the oxidant solution, such an abundant use being uneconomic.

One of the merits in using the aqueous solution of oxidant is the ease of controlling the reaction of infusibilization by utilizing the sensible and latent heat of water for absorbing the heat generated by the infusibilization, since the conductivity of the aqueous solution is better than that of the atmosphere of gaseous oxidant. Furthermore, while in the case where the starting material, that is, the admixture is prepared without adding any amorphous carbon particles, it takes a long time period for completing the infusibilization even using the aqueous solution of an oxidant at a high temperature, the infusibilization can be completed in a very short time period of 30 sec to 5 hours even at a low temperature in the case where the amorphous carbon particles are admixed. The reason for the above-mentioned phenomena has not yet been elucidated, however, it may be, in part, that the surface area of spherical particles is enlarged owing to porosity of the amorphous carbon.

Generally, the time period for completing infusibilization in aqueous phase of the porous particles of the present invention naturally depends on the concentration of the oxidant, the content of the amorphous carbon particles and the reaction temperature, and the tendency is quite the same as in all reaction between a solid material and an oxidant in aqueous phase.

After completion of infusibilization, the product is washed with water to remove the remaining oxidant in/on the product. The thus obtained product shows a raised softening point and a raised rate of carbonization as compared to those of the material before infusibilization.

Even when the infusibilized product obtained in Example 10 was momentarily heated to a temperature higher than 900° C. in a reductive gaseous atmosphere of water vapor or nitrogen gas, the carbonized or the activated carbon obtained by this treatment had not shown any bubbling, crushing and mutual adhering of the particles.

The spherical carbon or the spherical activated carbon obtained by carbonizing or activating the thus infusibilized product had the same quality as those obtained by the usual method.

In conclusion, the merits of the method of infusibilization using an aqueous solution of an oxidant are, in addition to the above-mentioned, the easiness of making the process system continuously operatable with more compactly designed elements of the apparatus than those in the conventional batch system, while consuming less energy.

The thus obtained spherical porous material is carbonized in an inert atmosphere at a temperature higher than 600° C. to prepare spherical carbon material, or by activating the thus obtained spherical infusibilized material with an activated agent mainly composed of water vapour, spherical activated carbon of the present invention is obtained.

The spherical carbon material or the spherical activated carbon, obtained from the admixture containing 5 to 40 weight % of the amorphous carbon based on the mixture by the present invention, shows a crushing strength increased more than 1.3 times that of the material or spherical activated carbon prepared from pitch without adding the amorphous carbon particles; it has other properties not different from those of the conventional comparative products, such as adsorbing activity. In addition, since the amorphous carbon particles for use in the present invention is available at a cheap price, the process of the present invention is more economically profitable in the case where the spherically shaped activated carbon is to be prepared. Further, according to the process of the present invention, the range of pitch which can be used for preparation of the excellent spherical activated carbon is broader than that for preparing such an excellent spherical activated carbon by the conventional method.

In the following examples, the characteristic properties of specimens is determined as follows.

Measuring Methods (1) Rate of Carbonization: "The rate of carbonization" is obtained by calculating according to the following formula (I):

$$\text{Rate of carbonization} = 100 - (A + B) \qquad (I)$$

wherein:

A is the percentage by weight of ash when the material is burnt under the conventional conditions, however, the value of A is very small, as 0.1 to 0.5% by weight, and so it is negligible, and B is the content of volatile matter in the material expressed by % by weight, and determined by the method prescribed in the Japanese Industrial Standards (abbreviated as JIS) M 8821/1972 and obtained by the following formula (II):

$$B\ (\%\ \text{by weight}) = \frac{\text{Decrement (g) of the specimen by heating}}{\text{Original weight (g) of the specimen}} \times 100 \qquad (II)$$

For reference: The rate of carbonization serves as the sign of the degree of polymerization of carbonaceous substances in the material.

(2) Yield of Activation: The yield of activation is represented by a quotient multiplied by 100, the quotient being obtained by dividing the weight of activated carbon obtained in the step of activation of the infusibilized pitch by the weight of the infusibilized pitch. Accordingly, the yield of activation is defined in percentage.

(3) Crushing Strength: The crushing strength of a spherical product is measured on one particle of the specified fraction between 590$\mu$ and 710$\mu$ obtained by sifting the specimen with a series of standard JIS sieves. The measurement of crushing strength of the spherule or the particle is carried out by crushing it with a hardness tester. The test run is repeatedly carried out on each of more than twenty particles or spherules, and the mean value is taken to be the crushing strength of the specimen obtained on the specified sieve above-mentioned.

(4) Iodine Adsorption: Determined according to the method prescribed in JIS K-1474/1975.

(5) Caramel Decoloration: Determined according to the method prescribed in JIS K-1470/1967.

(6) Hardness: Determined according to the method prescribed in JIS K-1474/1975.

The present invention will be explained in more detail by the following non-limitative examples, wherein parts mean parts by weight and % means % by weight.

EXAMPLE 1

A mixture of 50 kg of pitch, obtained by thermal cracking of naphtha, of a softening point of 182° C., a content of 10% of quinoline-insoluble matter and a ratio of H/C of 0.53, 25 kg of coconut shell-charcoal of less than 150 microns in average diameter and 25 kg of naphthalene was introduced into a 300-liter pressure vessel and fluidified by heating at a temperature of 210° C. as well as by further mixing to obtain a fluidified admixture of a softening point of 68° C. and of a pour point of 74° C. (measured by a Koka-type flow tester). The thus prepared admixture was cooled while in the pressure vessel to 80° to 85° C. and then, it was extruded from the vessel at a pressure of 50 kg/cm$^2$ through a nozzle having 100 holes of 1.5 mm in diameter installed at the bottom of the pressure vessel at a rate of 5 kg/min. The thus extruded string-like material was left to flow down along the conduit set at an inclination of about 40° into a cooling vessel containing water of 15° to 20° C. In this time, by pouring water in the conduit at a rate of 2.5 m/sec, the extruded string-like material was continuously stretched from just after extruding. The thus stretched string-like material of about 0.5 mm in diameter was accumulated in the cooling vessel, wherein the string-like material was cooled to solidify to be a brittle material easily snappable with fingers. The thus solidified string-like material was introduced into a high speed cutter of 300 mm and 500 mm diameter and height, respectively, provided with 2 blades of 100 mm and 60 mm length and width, respectively, together with water, and under a 3000 rpm of agitation it was cut into small stick-like material in one minute, the ratio of length to diameter of the stick-like material being about 1.5 under a microscope.

200 g of the stick-like cut material were separated from water and put into 1 kg of an aqueous 0.5% solution of polyvinyl alcohol of a saponification degree of 88%, and heated to a temperature higher than the softening point of the above-mentioned mixture, that is, 80° C., while agitating to disperse the material into the solution. The stick-like material became spherical in shape. By cooling the material as it was, spherical beads were obtained. Naphthalene contained in the beads was extracted with n-hexane. The thus obtained de-naphthalenized beads were dried by air flow and then infusibilized in a state of fluidized bed by using air flow of 20 liters of hot air/min/100 g of the beads and at a rate of temperature increase of 30° C./hour to the temperature of 300° C. The thus infusibilized beads were activated in a state of fluidized bed in an atmosphere of water vapour containing a nearly equal amount of gaseous nitrogen by heating to 900° C. at a rate of temperature rise of 200° C./hour and still heating at 900° C. for one hour.

The above-mentioned infusibilized beads did not bubble and were not crushed nor mutually adhering even when heated to 900° C. instantly in an atmosphere of gaseous nitrogen or in a reductive atmosphere.

The activated carbon obtained as above was composed of nearly spherical particles of 650 microns in average diameter with an apparent density of 0.58 g/cc, an iodine adsorption amount of 1100 mg/g, a decoloration rate of caramel of 85% and a hardness of 98%. The crushing strength was 1200 g per one particle of the activated carbon. The above-mentioned value of hardness represents the ratio of the remaining particles still keeping their original shape after a test run where the particles were subjected to mutual abrasion to whole particles subjected to the test, that is, the abrasion strength of the specimen.

COMPARATIVE EXAMPLE 1

A mixture of 75 kg of the same pitch used in Example 1 and 25 kg of naphthalene was processed in the almost same manner as in Example 1 to prepare spherical material and it was treated by the same infusibilization and activation under the same conditions as in Example 1 to obtain the activated carbon composed of nearly spherical particles of 600 microns in average diameter, of an apparent density of 0.60 g/cc, an iodine adsorption amount of 1050 mg/g and a decoloration rate of caramel of 83%. Although its capability of adsorption was nearly the same as that of the product in Example 1, it showed 85% of hardness and 500 g of crushing strength per one article, thus illustrated that the activated carbon obtained in Example 1 according to the method of the present invention is superior to the product obtained in Comparative Example 1 in crushing strength and abrasion resistance.

EXAMPLES 2 to 4

Respective admixtures composed of the same pitch as in Example 1, of the same coconut shell-charcoal as in Example 1 and of naphthalene at respective weight ratios shown in Table 1 were processed respectively in the same shaping, infusibilization and activation successively as in Example 1. The physical properties and the results of tests of the thus obtained activated carbons are shown also in Table 1, respectively.

TABLE 1

| Raw Materials for and Performance of Activated Carbons | | | |
|---|---|---|---|
| | Example 2 | Example 3 | Example 4 |
| Weight ratio | | | |
| Pitch (part) | 40 | 50 | 60 |
| Charcoal (part) | 60 | 50 | 40 |
| Naphthalene (part) | 45 | 41 | 40 |
| Admixture | | | |
| Softening point (°C.) | 69 | 58 | 49 |

TABLE 1-continued

| Raw Materials for and Performance of Activated Carbons | | | |
|---|---|---|---|
| | Example 2 | Example 3 | Example 4 |
| Pour point (°C.) | 71 | 63 | 55 |
| Performances | | | |
| Yield of activation (%) | 45 | 45 | 45 |
| Apparent density (g/cc) | 0.50 | 0.56 | 0.58 |
| Amount of iodine adsorption (mg/g) | 1,200 | 1,200 | 1,200 |
| Rate of decoloration (%) | 95 | 92 | 88 |
| Hardness (%) | 90 | 96 | 98 |
| Crushing strength (g/particle) | 800 | 1,000 | 1,000 |

EXAMPLE 5

The infusibilized beads obtained from the admixture shown in Example 1 were heated to 1,000° C. at a rate of 200° C./hour and kept for one hour at 1,000° C. in an atmosphere of nitrogen to effect the carbonization by baking. The thus obtained spherical carbon material was of 650 microns in average diameter, and its apparent density was 0.61 g/cc. The crushing strength was 2,000 g/particle.

COMPARATIVE EXAMPLE 2

The infusibilized beads obtained from the mixture of pitch and naphthalene as in Comparative Example 1 were treated in the same manner as in Example 5 to obtain a product of spherical carbon material not according to the method of the present invention. The thus obtained beads showed average diameter of 600 microns, apparent density of 0.70 g/cc and a crushing strength of 800 g/particle inferior to the product of Example 5.

EXAMPLES 6 TO 9 AND COMPARATIVE EXAMPLE 3

To 70 parts of coal-tar pitch of a softening point of 171° C., a content of quinoline-insoluble matter of 22.9% and a ratio of H/C of 0.61, 30 parts of the respective three kinds of amorphous carbon particles shown in Table 2 and 40 parts of naphthalene were admixed.

The respective three admixtures were subjected respectively to the same series of treatments as in Example 1 to prepare spherical carbon materials and spherical activated carbon, respectively. The performances and the properties of these products are shown also in Table 2.

In addition, as Comparative Example 3, a product was prepared according to the same procedures in Example 1 from a mixture of 100 parts by weight of coal-tar pitch and 40 parts by weight of naphthalene, and its performances and properties are also shown in Table 2.

TABLE 2

| Raw Materials for and Performance of Carbon Products | | | | | |
|---|---|---|---|---|---|
| | Example | | | | Comparative Example 3 |
| | 6 | 7 | 8 | 9 | |
| Amorphous carbon particles | (1) | (2) | Green cokes | Carbon black | None |
| its average size (μ) | 150 | 100 | 100 | 0.09 | |
| Admixture | | | | | |
| Softening point (°C.) | 60 | 63 | 53 | 65 | 49 |
| Pour point (°C.) | 63 | 66 | 59 | 68 | 51 |
| Spherical | | | | | |

TABLE 2-continued

Raw Materials for and Performance of Carbon Products

|  | Example | | | | Comparative Example 3 |
|---|---|---|---|---|---|
|  | 6 | 7 | 8 | 9 | |
| carbonaceous material | | | | | |
| Average particle size (μ) | 700 | 700 | 700 | 700 | 700 |
| Apparent density (g/cc) | 0.61 | 0.60 | 0.75 | 0.65 | 0.70 |
| Crushing strength[3] | 1500 | 1000 | 1200 | 900 | 700 |
| Activated carbon | | | | | |
| Yield of activation (%) | 45 | 45 | 45 | 45 | 45 |
| Apparent density (g/cc) | 0.58 | 0.56 | 0.62 | 0.60 | 0.65 |
| Amount of iodine adsorbed (mg/g) | 1200 | 1000 | 700 | 1000 | 1050 |
| Average diameter (μ) | 700 | 700 | 700 | 700 | 700 |
| Rate of decoloration (%) | 92 | 86 | 79 | 80 | 80 |
| Hardness (%) | 95 | 90 | 90 | 90 | 80 |
| Crushing strength[3] | 900 | 800 | 850 | 850 | 600 |

Notes:
[1] Coconut shell charcoal
[2] Sawdust-charcoal
[3] g/particle

EXAMPLE 10

An admixture composed of 50 kg of pitch obtained by thermal cracking of naphtha, of a softening point of 182° C., a rate of carbonization of 53%, n-heptane-soluble matter of 92%, and a quinoline-insoluble matter of 1.4%, 33.3 kg of naphthalene and 50 kg of coconut shell-charcoal of average size of smaller than 150 microns was introduced into a pressure vessel of capacity of 500 liters provided with a stirrer, and heated to 240° C. while stirring. The fluidified admixture was treated as in the first half part of Example 1 to obtain spherically shaped admixture. Naphthalene in this shaped admixture was then removed by extraction with n-hexane 6 times by volume of the shaped mixture to obtain a de-naphthalenized admixture of softening point of 240° C.

Into a 500-liter vessel provided with a stirrer and containing 200 kg of an aqueous 20% by weight solution of nitric acid, 20 kg of the spherically shaped and de-naphthalenized admixture were immersed and heated to 50° C. under mild agitation. Although the reaction heat evolved to the extent that the temperature of the liquid phase was raised by 4° C., the heat could be easily compensated by the latent heat of water and the dissipation of heat from the surface of the apparatus. The thus infusibilized spherical mixture was separated, washed with water to remove the remaining nitric acid and dried for 5 hours by air at 50° to 60° C. The thus prepared infusibilized mixture had the following properties:

(1) it was not softened even when heated to 320° C. as compared to the softening point of 240° C. before infusibilization;

(2) its rate of carbonization was 74% and higher than that before infusibilization of 71%;

(3) its oxygen content was 14% and higher than that before infusibilization of 5% and (4) it did not bubble and was not crushed nor did it adhere mutually even when it was heated instantly to a temperature higher than 900° C. in an atmosphere of nitrogen or a reductive atmosphere.

Accordingly, it is considered that the infusibilized material thus obtained by oxidation with nitric acid in wet process has been infusibilized to the same or higher degree as compared to the conventionally infusibilized material by oxidation in fluidized bed with air.

The above-mentioned infusibilized mixture was then activated in the following two steps: (1) heating from room temperature to 900° C. at a rate of 200° C./hour under gaseous nitrogen flow and then (2) keeping at a temperature of 900° C. for 1 to 2 hours in an atmosphere of a 1:1 by volume mixture of nitrogen and water vapour utilizing a water gas reaction.

The performance of the thus obtained spherical activated carbon were as follows:

Yield of activation of 48.3%;

Apparent density of 0.518 g/cc.

Amount of iodine adsorption of 1,030 mg/g activated carbon;

Rate of decoloration of caramel of 63%;

Crushing strength of 780 g/particle;

Cumulated specific pore-volume of pores with the range of diameter in: ∼10 Å:0.235 cc/g; ∼100 Å:0.403 cc/g.

| Diameter of the particle (μ) | Size distribution of the spherical activated carbon particle | | | | | |
|---|---|---|---|---|---|---|
|  | Fractions | | | | | |
|  | up to 150 | 150 to 400 | 400 to 600 | 600 to 780 | 780 to 1000 | over 1000 |
| Distribution in the Example 10 (% by weight) | 0 | 2 | 23 | 60 | 12 | 3 |
| Distribution in the usual method* (% by weight) | 18 | 8 | 23 | 23 | 20 | 8 |

Note:
*The usual method is described in Japanese Patent Publication No. 18879/75.

EXAMPLES 11 TO 14

The spherically shaped and de-naphthalenized mixture of pitch and carbonaceous material obtained in the first half part of Example 10 was infusibilized in the same manner as in the second half part of Example 10, however, while changing the concentration and amount of nitric acid as shown in Table 3 with the softening point and rate of carbonization of the infusibilized products.

TABLE 3

|  | Example | | | |
|---|---|---|---|---|
|  | 11 | 12 | 13 | 14 |
| Nitric acid | | | | |
| concentration (%) | 5 | 10 | 20 | 60 |
| amount* | 10 | 10 | 8 | 5 |
| Conditions | | | | |
| temperature (°C.) | 50 | 50 | 25 | 40 |
| reaction time (min) | 60 | 30 | 240 | 1 |
| Rate of carbonization (%) | 74.9 | 76.1 | 74.4 | 75.3 |
| Softening point (°C.) | of all the specimens of Example 11 to 14 were higher than 320° C., substantially not softened. | | | |

Note:
*Amount of nitric acid: parts per part of the spherically shaped and de-naphthalenized mixture of pitch and amorphous carbon particles.

COMPARATIVE EXAMPLE 4

The spherically shaped and de-naphthalenized mixture of pitch and amorphous carbon particles obtained in the first-half part of Example 10 was infusibilized in a fluidized bed by using air at a rate of 200 liters of air/min to 1 kg of the above-mentioned spherically shaped mixture in a manner of heating from room temperature to 300° C. at a rate of temperature rise of 30° C./min. The thus obtained infusibilized beads-like material was substantially infusible and had an appearance of porous beads containing 15% of oxygen, the rate of carbonization being 80%.

The spherical activated carbon obtained from these porous beads by the same procedures as in Example 10 showed nearly the same performances and physical properties as that which was obtained in Example 10, however, in Comparative Example 4, it took as long as 10 hours to carry out the infusibilization in a far larger apparatus at a higher temperature than in wet-system.

COMPARATIVE EXAMPLE 5

A mixture of 70 kg of the same pitch as in Example 10 and 30 kg of naphthalene was shaped into spherical material under the same conditions as in Example 10. Naphthalene was removed from the thus obtained spherical material by extraction with n-hexane to obtain the de-naphthalenized spherical pitch of a softening point of 235° C.

50 kg of the thus obtained spherical pitch were immersed in 1200 kg of an aqueous 20% solution of nitric acid at 50° C. for 10 hours under agitation in a 1.5 m³-vessel with a stirrer. Then, the deposited spherical pitch was separated, washed with a plenty of water and dried for 5 hours by using air at 50° to 60° C.

The thus obtained infusibilized pitch showed a raised softening point of 294° C. as compared to 235° C. of the softening point of the material before infusibilization. Also the rate of carbonization was larger than that before the treatment as shown by 69% vs. 66%. Accordingly, although it is recognizable that considerable oxidation has been carried out in the above-mentioned treatment, the infusibility was still insufficient because the product melted in a direct flame.

Accordingly, the product could not be directly subjected to the following step of activation.

EXAMPLES 15 TO 17

The same de-naphthalenized spherically shaped admixture as in Example 10 was subjected to insolubilization in wet system under the same conditions as in the second-half part of Example 10, however, using several kinds of oxidants in an aqueous solution, respectively. The conditions and properties of infusibilization and the thus obtained infusibilized products are shown respectively in Table 4.

TABLE 4

|  | Example | | | | | |
|---|---|---|---|---|---|---|
|  | 15 | | 16 | | 17 | |
| Oxidant (composition) | $H_2SO_4$ $H_2O$ | 75% 25% | $H_2SO_4$ $KNO_3$ $H_2O$ | 25% 15% 60% | $H_2SO_4$ $K_2Cr_2O_7$ $H_2O$ | 20% 20% 60% |
| Amount of oxidant Parts by weight to one part of de-naphthalenized mixture | 10 | | 8 | | 8 | |
| Reaction temperature (°C.) | 60 | | 40 | | 40 | |
| Reaction time (min) | 30 | | 30 | | 30 | |
| Rate of carbonization (%) | 76.2 | | 79.2 | | 80.3 | |

TABLE 4-continued

|  | Example | | |
|---|---|---|---|
|  | 15 | 16 | 17 |
| Softening points of all the specimens were higher than 320° C. | | | |

Each of the thus prepared de-naphthalenized spherically shaped material could be activated, and the obtained spherical activated carbons showed nearly the same performances as those in Example 10.

EXAMPLE 18

Two parts of 61% nitric acid were sprayed onto 10 parts of spherically shaped admixture removed naphthalene prepared in the first-half part of Example 10 at a temperature of 70° C.

On shaking the thus obtained mixture for 5 min at 70° C., the sprayed nitric acid was removed from the mixture by reaction and evaporation due to the reaction heat to leave the insolubilized beads-like material almost dried having its softening point of higher than 320° C. The rate of carbonization of the product was 77%. The spherical activated carbon obtained by activating the thus obtained beads-like material showed the same performances as conventional spherical activated carbon.

EXAMPLES 19 AND 20

In the same manner as in Example 10, however, using green cokes (in Example 19) or charcoal from sawdust (in Example 20) of average size of smaller than 100 microns instead of coconut shell-charcoal in Example 10 as amorphous carbon particles, each de-naphthalenized spherically shaped material was prepared. The infusibilization of each de-naphthalenized spherically shaped material could be smoothly carried out.

EXAMPLE 21

In the same manner as in Example 10, however, using carbon black of average size of 0.09 microns instead of coconut shell-charcoal in Example 10, a spherical activated carbon was prepared. The infusibilization was preferably carried out. The thus obtained spherical activated carbon showed the substantially same properties and performances as those of the spherical activated carbon obtained in Example 10.

What is claimed is:

1. A process for preparing a spherical carbon material, comprising the steps of:
    heating while continuously stirring an admixture of (a) 100 parts by weight of a mixture of 30 to 95 weight percent of a pitch and 5 to 70 weight percent of amorphous carbon particles having a diameter smaller than 200 microns and (b) 5 to 50 parts by weight of a viscosity-controlling agent, thereby fluidifying uniformly said admixture;
    extruding the fluidified admixture from an extrusion die, thereby forming the fluidified admixture into a string-like shape;
    cooling the formed admixture having a string-like shape;
    cutting the cooled admixture having a string-like shape into fragments having a stick-like shape;
    putting the fragments into hot water kept at a temperature higher than the softening point of said admixture, thereby obtaining spherical particles of said admixture;

removing said viscosity-controlling agent from the obtained spherical particles;

infusibilizing the resultant spherical particles with an aqueous solution of an oxidant selected from the group consisting of nitric acid, sulfuric acid, persulfuric acid, peracetic acid, permanganate, dichromate, a salt of halogen oxyacid and a mixture thereof, and carbonizing the infusibilized spherical particles.

2. The process according to claim 1, wherein the amorphous carbon particles are selected from the group consisting of charcoal, green coke and carbon black.

3. A process for preparing spherical activated carbon, comprising the steps of:

heating while continuously stirring an admixture of (a) 100 parts by weight of a mixture of 30 to 95 weight percent of a pitch and 5 to 70 weight percent of amorphous carbon particles having a diameter smaller than 200 microns and (b) 5 to 50 parts by weight of a viscosity-controlling agent, thereby fluidifying uniformly said admixture;

extruding the fluidified admixture from an extrusion die, thereby forming the fluidified admixture into a string-like shape;

cooling the formed admixture having a string-like shape;

cutting the cooled admixture having a string-like shape into fragments having a stick-like shape;

putting the fragments into hot water kept at a temperature higher than the softening point of said admixture, thereby obtaining spherical particles of said admixture;

removing said viscosity-controlling agent from the obtained sphere;

infusibilizing the resultant spherical particles with an aqueous solution of an oxidant selected from the group consisting of nitric acid, sulfuric acid, persulfuric acid, peracetic acid, permanganate, dichromate, a salt of halogen oxyacid and a mixture thereof;

carbonizing the infusibilized spherical particles; and activating the carbonized spherical particles.

* * * * *